United States Patent
Friedrich et al.

(10) Patent No.: US 12,145,195 B2
(45) Date of Patent: Nov. 19, 2024

(54) METHOD FOR THE PRODUCTION OF A STRUCTURAL COMPONENT

(71) Applicant: Bayerische Motoren Werke Aktiengesellschaft, Munich (DE)

(72) Inventors: Martin Friedrich, Unterschleissheim (DE); Lukas Knorr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 941 days.

(21) Appl. No.: 16/971,369

(22) PCT Filed: Apr. 17, 2019

(86) PCT No.: PCT/EP2019/059898
§ 371 (c)(1),
(2) Date: Aug. 20, 2020

(87) PCT Pub. No.: WO2019/219317
PCT Pub. Date: Nov. 21, 2019

(65) Prior Publication Data
US 2020/0398462 A1 Dec. 24, 2020

(30) Foreign Application Priority Data
May 15, 2018 (DE) ...................... 10 2018 207 444.5

(51) Int. Cl.
*B22D 25/00* (2006.01)
*B22F 3/11* (2006.01)
(Continued)

(52) U.S. Cl.
CPC .......... *B22D 25/005* (2013.01); *B22F 3/1125* (2013.01); *B22F 10/12* (2021.01);
(Continued)

(58) Field of Classification Search
CPC .................. B22F 3/1125–2003/1131
See application file for complete search history.

(56) References Cited

U.S. PATENT DOCUMENTS

2003/0185685 A1 10/2003 Simon
2006/0063447 A1* 3/2006 Jolley ..................... B68C 1/025
441/65
(Continued)

FOREIGN PATENT DOCUMENTS

CN 1449470 A 10/2003
CN 103128897 A 6/2013
(Continued)

OTHER PUBLICATIONS

Plastics Decorating; https://plasticsdecorating.com/articles/2016/treating-the-surface-options-for-all-surface-types/; retrieved from internet on Nov. 9, 2023; dated May 6, 2016 (Year: 2016).*

(Continued)

*Primary Examiner* — Alexandra M Moore
*Assistant Examiner* — Austin Pollock
(74) *Attorney, Agent, or Firm* — Crowell & Moring LLP

(57) ABSTRACT

A method for producing a structural component having a foam structure formed by foaming a foamable material, includes the following steps: additively building a receiving component that reproduces the outer geometry of the structural component to be produced at least in some sections, in particular completely, and having a receiving space for receiving foamable material; introducing at least one foamable material into the receiving space of the receiving component; and carrying out at least one measure for foaming the foamable material introduced into the receiving space of the receiving component so as to form the foam structure.

15 Claims, 1 Drawing Sheet

(51) Int. Cl.
   *B22F 10/12* (2021.01)
   *B22F 10/14* (2021.01)
   *B22F 10/28* (2021.01)
   *B22F 10/43* (2021.01)
   *B22F 10/47* (2021.01)
   *B29B 11/06* (2006.01)
   *B29C 44/10* (2006.01)
   *B29C 44/18* (2006.01)
   *B29C 64/10* (2017.01)
   *B29K 705/00* (2006.01)
   *B33Y 10/00* (2015.01)
   *B33Y 80/00* (2015.01)

(52) U.S. Cl.
   CPC .............. *B22F 10/14* (2021.01); *B22F 10/28* (2021.01); *B22F 10/43* (2021.01); *B22F 10/47* (2021.01); *B29B 11/06* (2013.01); *B29C 44/10* (2013.01); *B29C 44/181* (2013.01); *B29C 64/10* (2017.08); *B33Y 10/00* (2014.12); *B33Y 80/00* (2014.12); *B29K 2705/00* (2013.01)

(56) References Cited

U.S. PATENT DOCUMENTS

| | | | |
|---|---|---|---|
| 2009/0075084 A1* | 3/2009 | Kochi | C08G 18/7664 428/409 |
| 2013/0133557 A1 | 5/2013 | Yoshinaga | |
| 2013/0277891 A1 | 10/2013 | Teulet | |
| 2013/0337232 A1 | 12/2013 | Hauck et al. | |
| 2014/0346942 A1 | 11/2014 | Kim et al. | |
| 2015/0040570 A1* | 2/2015 | Uskert | F01D 5/282 29/889 |
| 2015/0298423 A1* | 10/2015 | Holemans | B64C 1/12 428/116 |
| 2016/0059485 A1 | 3/2016 | Ding et al. | |
| 2019/0105852 A1* | 4/2019 | Hoyle | B29C 64/10 |
| 2019/0322039 A1* | 10/2019 | Bursch | B29C 64/188 |
| 2020/0061935 A1* | 2/2020 | Martinez | B29C 70/443 |
| 2020/0298311 A1* | 9/2020 | Seeliger | B22F 7/006 |

FOREIGN PATENT DOCUMENTS

| | | | | |
|---|---|---|---|---|
| CN | 103402725 A | | 11/2013 | |
| CN | 203279375 U | | 11/2013 | |
| CN | 104180595 A | | 12/2014 | |
| CN | 206172196 U | | 5/2017 | |
| CN | 110373992 A | * | 10/2019 | |
| DE | 30609332 C2 | | 6/1990 | |
| DE | 102007015389 A1 | * | 10/2007 | ............. B22F 3/105 |
| DE | 10 2011 011 185 A1 | | 8/2012 | |
| DE | 102015212569 A1 | * | 1/2017 | |
| FR | 2 974 316 A1 | | 10/2012 | |
| WO | WO 2014/143340 A2 | | 9/2014 | |

OTHER PUBLICATIONS

English translation of Chinese Office Action issued in Chinese Application No. 201980020962.4 dated Dec. 27, 2021 (12 pages).
International Search Report (PCT/ISA/210) issued in PCT Application No. PCT/EP2019/059898 dated Jul. 29, 2019 with English translation (four (4) pages).
German-language Written Opinion (PCT/ISA/237) issued in PCT Application No. PCT/EP2019/059898 dated Jul. 29, 2019 (six (6) pages).
German-language Search Report issued in German Application No. 10 2018 207 444.5 dated Feb. 19, 2019 with partial English translation (12 pages).
Cover page of EP 2 946 078 published Nov. 25, 2015 (one (1) page).
English translation of Chinese Office Action issued in Chinese Application No. 201980020962.4 dated May 25, 2021 (10 pages).

* cited by examiner

METHOD FOR THE PRODUCTION OF A STRUCTURAL COMPONENT

BACKGROUND AND SUMMARY OF THE INVENTION

The invention relates to a method for producing a structural component which comprises a foam structure formed by foaming of a foamable material.

Corresponding methods for producing a structural component which comprises a foam structure formed by foaming of a foamable material are basically known in a wide variety of embodiments from the prior art.

Here, the implementation of known methods for producing corresponding structural components has hitherto been relatively cumbersome, such that fast and inexpensive production of corresponding structural components in a simple manner in terms of manufacturing technology, which may be necessary or desired for example in the context of the production of prototype components, has not been possible in an entirely satisfactory manner.

There is accordingly a demand for a method, which is improved in relation to this, for producing corresponding structural components.

The invention is based on the object of providing a method for producing a structural component which comprises a foam structure formed by foaming of a foamable material, which method is improved in particular with regard to simple, fast and inexpensive production of corresponding structural components.

The object is achieved by means of a method for producing a structural component which comprises a foam structure formed by foaming of a foamable material, as per the independent claims. The dependent claims in this regard relate to possible embodiments of the method.

The method described herein serves for producing a structural component which comprises a foam structure formed by foaming of a foamable material, that is to say a foam formed by foaming of a foamable material. A corresponding structural component may be in particular a prototype component; the method may correspondingly be applied or implemented in particular for producing prototype components.

The method comprises the following main steps.

In a first step of the method, a receiving component which comprises a receiving space or a receiving volume for receiving foamable material is additively or generatively built up or formed. It is essential here that the receiving component replicates, at least in certain sections, in particular completely, the external geometry or contour of the structural component that is actually to be produced. The geometrical-structural design of the receiving component is accordingly selected with regard to the geometrical-structural design of the structural component that is actually to be produced.

During the course of the additive build-up or formation of the receiving component, functional elements, such as for example receptacles, may possibly be formed on and/or in the receiving component.

The additive build-up of the receiving component is typically performed by successive layerwise selective hardening—the hardening may be performed in particular by means of a curing, fusing or sintering process—of building material layers composed of a correspondingly hardenable building material. The additive build-up of the receiving component is performed on the basis of building data which describe the geometry of the receiving component. Basically all additive build-up processes may be considered for the additive build-up of the receiving component, and reference is therefore made merely by way of example to a selective laser sintering process, a selective laser fusion process, a selective electron beam fusion process, a stereolithography process or a binder jetting process. The additive build-up of the receiving component is performed in a device for the additive production of three-dimensional objects; the specific embodiment of the device is determined in accordance with the specifically used additive build-up process.

The additively produced receiving component may, owing to the provision of a corresponding receiving space or receiving volume, also be designated or regarded as a receiving casing configured for receiving foamable material.

In a second step, which follows the first step, of the method, at least one foamable or expandable or (pre-)expanded material is introduced into the receiving space of the receiving component. The receiving component is thus filled with at least one foamable material. The introduction of the at least one foamable material into the receiving component may be performed manually or in at least partially automated fashion.

In a third step, which follows the second step, of the method, at least one measure for foaming the foamable material that has been introduced into the receiving space of the receiving component is implemented, so as to form the foam structure or the foam and thus the structural component. The measure for foaming the foamable material that has been introduced into the receiving space of the receiving component includes, for example, a sufficiently great introduction of energy into the foamable material, which leads to a foaming or an expansion of the foamable material and thus to the formation of an, in particular closed-celled or open-celled, foam structure. The energy may for example be thermal energy, for example in the form of a correspondingly temperature-controlled temperature-control medium, such as for example steam, and/or radiation energy, such as for example UV radiation. Chemically initiated foaming processes, such as are possible for example in the case of multi-component foams, are also conceivable.

By means of the additive formation, according to the method, of a receiving component which replicates the external geometry or contour of the structural component to be produced, a simple and fast and inexpensive means for producing a corresponding structural component is realized; an improved method for producing a corresponding structural component is thus provided.

As mentioned, the receiving component may be designated or regarded as a receiving casing configured for receiving foamable material. The receiving component can accordingly in particular perform the function of a casing which in particular circumferentially surrounds or encloses, at least in certain sections, in particular completely, the foam structure. The receiving component may thus be formed in the manner of a casing.

Correspondingly, it is in particular possible for the structural component to be formed as an integral foam structural component which comprises an, in particular compact, outer skin and a core enclosed by said outer skin, referred to for short as an integral foam structure which comprises an, in particular compact, outer skin and a foamed core, wherein the receiving component forms the outer skin, and the foam structure forms the core of the integral foam structural component.

The foamable material may be connected in particular in positively locking and/or cohesive fashion to the receiving component during the course of the implementation of the at least one measure for foaming the foamable material that has been introduced into the receiving space of the receiving component. For a positively locking connection, it is typically necessary for the foam to engage into and/or through the receiving component, or vice versa. A positively locking connection does not imperatively require chemical similarity or compatibility between the material that forms the receiving component and the foamable material. By contrast, for a cohesive connection, a certain chemical similarity or compatibility between the material that forms the receiving component and the foamable material is typically required; this may be the case for example in the case of chemically similar or compatible metals or plastics. By way of example, reference is made to the chemical compatibility between, for example polyurethane-based, plastics. An analogous situation self-evidently applies to other chemically similar or chemically compatible materials or material groups.

In all cases, a connection between the foamable material and the receiving component may be caused or promoted by means of a surface-activating measure, that is to say for example a corona or plasma treatment. In this context, the use of an adhesion-promoting component, that is to say for example an adhesion-promoting layer, is also conceivable.

Basically all materials that can be processed in the context of an additive build-up process may be considered for forming the receiving component. Since additive build-up processes are widely established in particular in conjunction with metals and plastics, the receiving component may be built up for example from an, in particular pulverulent, metal or from an, in particular pulverulent, plastic. Since the structural characteristics, that is to say in particular the mechanical characteristics, of the structural component can also be influenced or controlled by means of the material selection of the receiving component, the material selection of the receiving component is typically also determined in accordance with the desired structural characteristics of the structural component.

As foamable material, consideration may be given to basically all chemically and/or physically foamable materials, in particular chemically and/or physically foamable metals or chemically and/or physically foamable plastics. These are to be understood in particular as also encompassing foamable particle foam materials or plastics particle foam materials. The foam structure may thus be in particular a metal foam or a plastics foam structure, in particular a plastics particle foam structure. Since the structural characteristics, that is to say in particular the mechanical characteristics, of the structural component can also be influenced or controlled by means of the material selection of the foamable material, the material selection of the foamable material is typically also determined in accordance with the desired structural characteristics of the structural component.

The receiving component may be formed with at least one functional element which forms a part of a functional structure on the receiving component. The formation of corresponding functional elements or structures is readily possible owing to the additive build-up of the receiving component; the additive build-up of the receiving component makes it possible to realize functional elements or structures which differ in terms of function.

The or at least one corresponding functional element may for example be formed as an opening which forms an inlet for an in particular gaseous or liquid medium which initiates and/or assists a foaming process of the foamable material. It is for example also possible for the or at least one corresponding functional element to be formed as an opening which forms an outlet for in particular gaseous or liquid medium that is generated during a foaming process of the foamable material. Likewise, it is for example possible for the or at least one functional element to be formed as a connector for a pressure-generating device which generates a particular pressure level, in particular a particular negative pressure level, within the receiving component, in particular a vacuum generating device. By connection of a corresponding pressure-generating device, it is for example possible for uniform filling without air inclusions to be made possible. Furthermore, it is for example possible for the or at least one functional element to be formed for example as a reinforcement element which mechanically reinforces the receiving component at least in certain sections, possibly completely, that is to say for example a lattice, a rib, bead etc. Finally, it is for example possible for the or at least one functional element to be formed as an in particular bar-like or bar-shaped support element (support) which supports the receiving space at least in certain sections. Other embodiments of corresponding functional elements are conceivable. The receiving component may self-evidently be formed with functional elements which differ in terms of function. In this context, reference is made for example to separating elements or walls which divide the receiving space of the receiving component into mutually separate individual regions which can be separately filled with foamable material and thus separately foamed.

The at least one measure for foaming the at least one foamable material may be implemented in a tool which comprises an in particular temperature-controllable tool interior space (tool cavity). For this purpose, use may be made in particular of a foaming tool which may be designed with different functionality depending on the specific nature of the foaming process. For example, a foaming tool may be equipped with a facility for introducing an energy quantity required for initiating and/or controlling the foaming process of the foamable material; this may be achieved for example by temperature control of the tool or of the tool interior space, an introduction of steam into the tool or the tool interior space or an introduction of radiation energy into the tool or the tool interior space. As will become apparent further below in conjunction with an expedient support structure that can be introduced into the tool interior space, it is not necessary for the tool to replicate the external geometry or contour of the structural component to be produced. In this way, the outlay in terms of plant technology and/or manufacturing technology for producing the structural component can be considerably reduced.

At least one support structure which negatively replicates, at least in certain sections, in particular completely, the external geometry or contour of the receiving component may be introduced into the tool interior space. The support structure that thus supports the receiving component at least in certain sections may be expedient in particular in the case of relatively complex geometries of the receiving component. The support structure may furthermore permit a discharge or distribution of heat that has possibly been generated during the foaming process of the foamable material, and a prevention of an expansion of the receiving component possibly caused owing to the foaming process of the foamable material. The introduction of the support structure is typically performed prior to the implementation of the at least one measure for foaming the foamable material. The support structure may be removed, and possibly reused, after the completion of the foaming process of the foamable material.

The support structure may be formed for example by filling the tool interior space with a free-flowing or pourable, that is to say in particular granular or pulverulent, support material, in particular such that the granular or pulverulent support material surrounds, at least in certain sections, in particular completely, the receiving component that has been introduced into the tool interior space. A corresponding free-flowing or pourable support material may have inert characteristics. A corresponding free-flowing or pourable support material may thus for example be glass bodies, in particular glass beads.

The structural component may be produced as a motor vehicle component for installation in a motor vehicle, in particular as a paneling element. This also applies in conjunction with the possibility, mentioned further above, of the structural component being produced as a prototype component. The structural component to be produced may accordingly be a prototype component of a motor vehicle component to be installed in a motor vehicle, in particular of a paneling element.

Aside from the method, the invention also relates to a structural component which is produced in accordance with the method described herein. All statements made in conjunction with the method thus apply analogously to the structural component.

Furthermore, the invention relates to a motor vehicle, in particular a passenger motor vehicle, which comprises at least one corresponding structural component. All statements made in conjunction with the method thus apply analogously to the motor vehicle.

The invention will be discussed in more detail below in conjunction with the exemplary embodiment illustrated in the drawing.

BRIEF DESCRIPTION OF THE DRAWING

The single FIGURE shows a diagrammatic illustration of a tool used in the context of an exemplary embodiment of a method.

DETAILED DESCRIPTION OF THE DRAWING

The single FIGURE shows a diagrammatic illustration of a tool 2 which is usable or used in the context of an exemplary embodiment of a method for producing a structural component 1, in a perspective view.

The structural component 1 may be produced as a motor vehicle component for installation in a motor vehicle, in particular as a paneling element. In particular, the structural component 1 to be produced may be a prototype component of a motor vehicle component to be installed in a motor vehicle, in particular of a paneling element.

The tool 2 comprises a tool interior space 4 which is delimited or defined by tool wall sections 3. The tool interior space 4 may be temperature-controlled by means of temperature-control devices (not illustrated in any more detail).

The method that can be implemented for example using the tool 2 comprises the following steps.

In a first step of the method, a receiving component 7 which comprises a receiving space 5 or a receiving volume for receiving foamable material 6 is additively or generatively formed or built up. Here, it is essential that the receiving component 7 already replicates the external geometry or contour of the structural component 1 that is actually to be produced. The geometrical-structural design of the receiving component 7 is thus selected with regard to the geometrical-structural design of the structural component 1 that is actually to be produced.

The additive formation of the receiving component 7 is performed by successive layerwise selective hardening of building material layers composed of a correspondingly hardenable building material. The additive formation of the receiving component 7 is performed on the basis of building data which describe the geometry of the receiving component 7. Basically all additive build-up processes may be considered for the additive formation of the receiving component 7, and reference is therefore made merely by way of example to a selective laser sintering process, a selective laser fusion process, a selective electron beam fusion process, a stereolithography process or a binder jetting process. The additive formation of the receiving component is typically performed in a separate device for the additive production of three-dimensional objects; the specific embodiment of the device is determined in accordance with the specifically used additive build-up process.

As is evident, the additively produced receiving component 7 may, owing to the provision of a corresponding receiving space 5, also be designated or regarded as a receiving casing configured for receiving foamable material 6.

In a second step, which follows the first step, of the method, a foamable or expandable material 6 is introduced into the receiving space 5 of the receiving component 7. In the FIGURE, the foamable material has already been introduced into the receiving space 5 of the receiving component 7. The receiving component 7 is thus filled with a foamable material 6. The introduction of the foamable material 6 into the receiving component 7 may be performed manually or in at least partially automated fashion.

In a third step, which follows the second step, of the method, at least one measure for foaming the foamable material 6 that has been introduced into the receiving space 5 of the receiving component 7 is implemented, so as to form a foam structure 8 of the structural component 1 and thus the structural component 1. The foaming process of the foamable material 6 is schematically shown in the FIGURE. The measure for foaming the foamable material 6 includes a sufficiently great introduction of energy into the foamable material 6, which leads to a foaming or an expansion of the foamable material 6 and thus to the formation of an, in particular closed-celled or open-celled, foam structure 8. The energy may for example be thermal energy, for example in the form of a correspondingly temperature-controlled temperature-control medium, such as for example steam, and/or radiation energy, such as for example UV radiation. Chemically initiated foaming processes, such as are possible for example in the case of multi-component foams, are also conceivable.

As mentioned, the receiving component 7 may be designated or regarded as a receiving casing configured for receiving foamable material 6. The receiving component 7 thus in particular performs the function of a casing which circumferentially surrounds or encloses the foam structure 8. The receiving component is thus formed in the manner of a casing.

In the exemplary embodiment shown in the FIGURE, the structural component 1 is formed as an integral foam structural component or structure which comprises a compact outer skin 9 and a core 10 enclosed by said outer skin, wherein the receiving component 7 forms the outer skin 9, and the foam structure 8 forms the core 10 of the integral foam structural component.

The foamable material 6 may be connected in particular in positively locking and/or cohesive fashion to the receiving component 7 during the course of the implementation of the measure for foaming. For a positively locking connection, it is typically necessary for the foam to engage into and/or through the receiving component, or vice versa. A positively locking connection does not imperatively require chemical similarity or compatibility between the material that forms the receiving component 7 and the foamable material 6. By contrast, for a cohesive connection, a certain chemical similarity or compatibility between the material that forms the receiving component 7 and the foamable material 6 is required; in the exemplary embodiment shown in the FIGURE, this is realized by way of example by virtue of the receiving component 7 being formed from a thermoplastic polyurethane (TPU) and the foamable material being formed from polyurethane (PUR). An analogous situation self-evidently applies to other chemically similar or chemically compatible materials or material groups.

The receiving component 7 may be formed with at least one functional element 11 which forms a part of a functional structure on the receiving component. The formation of corresponding functional elements 11 is readily possible owing to the additive build-up of the receiving component 7; the additive build-up of the receiving component 7 makes it possible to realize functional elements 11 which differ in terms of function.

In the exemplary embodiment shown in the FIGURE, a first exemplary functional element 11 is formed as an opening 12 which forms an inlet for an in particular gaseous or liquid medium which initiates and/or assists a foaming process of the foamable material. A second exemplary functional element 11 is formed as an opening 13 which forms an outlet for an in particular gaseous or liquid medium that is generated during a foaming process of the foamable material 6. As is evident, the two openings 12, 13 are formed on different, in particular mutually oppositely situated, wall sections of the receiving component 7.

Likewise, it is for example possible for a functional element 11 to be formed as a connector for a pressure-generating device which generates a particular pressure level, in particular a particular negative pressure level, within the receiving component 4, in particular a vacuum generating device. By the connection of a corresponding pressure-generating device, it is for example possible for a uniform filling without air inclusions to be made possible. It is self-evidently also possible for a corresponding opening 12 to be used as a connector of said type.

Furthermore, it would for example be possible for a functional element 11 to be formed as a reinforcement element which mechanically reinforces the receiving component 7 at least in certain sections, possibly completely, that is to say for example a lattice, a rib, bead etc., or as an in particular bar-like or bar-shaped support element (support) which supports the receiving space 5 at least in certain sections. The receiving component 7 may self-evidently be formed with functional elements 11 which differ in terms of function. In this context, reference is made for example to separating elements or walls which divide the receiving space of the receiving component 7 into mutually separate individual regions which can be separately filled with foamable material 6 and thus separately foamed.

The tool 2 is equipped with a facility for introducing an energy quantity required for initiating and/or controlling the foaming process of the foamable material 6. This may be achieved, for example, by means of said facility for temperature control of the tool 2. In the exemplary embodiment shown in the FIGURE, base-side temperature control of the tool 2 or of the tool interior space 4 is indicated by means of the undulating line 16. Also basically conceivable is an introduction of steam into the tool 2 or the tool interior space 4 or an introduction of radiation energy into the tool 2 or the tool interior space 4.

In the exemplary embodiment shown in the FIGURE, a support structure 14 which negatively replicates, at least in certain sections, in particular completely, the external geometry or contour of the receiving component 7 is introduced into the tool interior space 4. The support structure 14 that thus supports the receiving component 7 may be expedient in particular in the case of relatively complex geometries of the receiving component. The support structure 14 may furthermore permit a discharge or distribution of heat that has possibly been generated during the foaming process of the foamable material 6, and a prevention of an expansion of the receiving component 7 possibly caused owing to the foaming process of the foamable material 6. The introduction of the support structure 14 is typically performed prior to the implementation of the measure for foaming the foamable material 6. The support structure 14 may be removed, and possibly reused, after the completion of the foaming process of the foamable material 6.

The support structure 14 is formed, in the exemplary embodiment shown in the FIGURE, by filling the tool interior space 4 with a free-flowing or pourable, that is to say in particular granular or pulverulent, support material 15, in particular such that the granular or pulverulent support material 15 surrounds the receiving component 7 that has been introduced into the tool interior space 4. A corresponding free-flowing or pourable support material 15 may have inert characteristics. A corresponding free-flowing or pourable support material 15 may thus for example be glass bodies, in particular glass beads.

It can be seen from the FIGURE that the tool 2 does not replicate the external geometry or contour of the structural component 1 to be produced. This is not necessary owing to the use of a corresponding support structure 14.

What is claimed is:

1. A method for producing a structural component which comprises a foam structure formed by foaming of a foamable material, the method comprising the steps of:

additively building up a receiving component which replicates, at least in certain sections, an external geometry of the structural component to be produced and which comprises a receiving space for receiving foamable material;

introducing at least one foamable material into the receiving space of the receiving component, wherein at least one support structure permits a discharge of heat and prevents expansion of the receiving component;

implementing at least one measure for foaming the foamable material that has been introduced into the receiving space of the receiving component, so as to form the foam structure; and using a surface-activation measure to create a connection between the foam structure and the receiving component, wherein the at least one measure for foaming the at least one foamable material is implemented in a tool which comprises a temperature-controllable tool interior space, and the at least one support structure negatively replicates, at least in certain sections, the external geometry of the receiving component and is introduced into the tool interior space.

2. The method according to claim 1, wherein
the receiving component is formed in the manner of a casing.

3. The method according to claim 1, wherein
the structural component is formed as an integral foam structural component which comprises an outer skin and a core enclosed by said outer skin, and
the receiving component forms the outer skin, and the foam structure forms the core of the integral foam structural component.

4. The method according to claim 1, wherein
the foamable material is connected in a positively locking and/or cohesive fashion to the receiving component during the course of the implementation of the at least one measure for foaming the foamable material that has been introduced into the receiving space of the receiving component.

5. The method according to claim 1, wherein
the support structure is formed by filling the tool interior space with a free-flowing or pourable support material such that the free-flowing or pourable support material surrounds, at least in certain sections, the receiving component that has been introduced into the tool interior space.

6. The method according to claim 1, wherein
the receiving component is additively built up by a selective laser sintering process, a selective laser fusion process, a selective electron beam fusion process, a stereolithography process, or a binder jetting process.

7. The method according to claim 1, wherein
the surface-activation measure is a corona or plasma treatment.

8. The method according to claim 1, wherein
the receiving component is formed with at least one functional element which forms a part of a functional structure on the receiving component.

9. The method according to claim 8, wherein one of:
the at least one functional element is formed as an opening which forms an inlet for a medium which initiates and/or assists a foaming process of the foamable material,
the at least one functional element is formed as an opening which forms an outlet for gaseous medium that is generated during a foaming process of the foamable material,
the at least one functional element is formed as a connector for a pressure-generating device which generates a particular pressure level within the receiving component,
the at least one functional element is formed as a reinforcement element which mechanically reinforces the receiving component at least in certain sections, or
the at least one functional element is formed as a support element which supports the receiving space at least in certain sections.

10. The method according to claim 1, wherein
the receiving component is produced from a metal or from a plastic.

11. The method according to claim 10, wherein
the metal or plastic is a pulverulent metal or plastic.

12. The method according to claim 1, wherein
a chemically and/or physically foamable material is used.

13. The method according to claim 12, wherein
the foamable material is a chemically and/or physically foamable metal or plastic material.

14. The method according to claim 1, wherein
the structural component is formed as a motor vehicle component for installation in a motor vehicle.

15. The method according to claim 14, wherein
the motor vehicle component is a paneling element.

* * * * *